United States Patent Office 2,706,182

Patented Apr. 12, 1955

2,706,182

POLYMERIZATION OF OLEFIN OXIDES

Malcolm E. Pruitt, Lake Jackson, Joseph M. Baggett, Freeport, Richard J. Bloomfield, Lake Jackson, and James H. Templeton, Freeport, Tex., assignors to The Dow Chemical Company, Midland, Mich., a corporation of Delaware No Drawing. Application June 5, 1952, Serial No. 291,966

5 Claims. (Cl. 260—2)

This invention relates to a catalytic process for the polymerization of propylene oxide and other olefin oxides to solid polymers.

As is well known, ethylene oxide may be polymerized to a variety of useful products which range from oily liquids to wax-like solids, depending on the degree of polymerization. The same is true of isobutylene oxide which, in the presence of boron trifluoride, is rapidly converted to a white wax. Quite in contrast, propylene oxide has heretofore shown little or no tendency to form solid polymers. This oxide is known to polymerize rapidly in the presence of alkalies or acids, and even explosively with Friedel-Crafts catalysts such as stannic chloride. However, the products have invariably been viscous liquids of a low degree of polymerization.

It has recently been found that by using certain iron compounds as catalysts, propylene oxide may be converted in good yield to solid polymers having melting points above 50° C., often above 70° C., and average molecular weights over 100,000. These polymers are white resinous products with considerable crystallinity, and have specific gravities in the range 1.03 to 1.05. A detailed description of them, and of their manufacture, stabilization, and use is given in our application Serial No. 291,964 filed simultaneously herewith. Among the catalysts mentioned in that application as useful in making the new polymers are certain iron-containing hydrates. It is with polymerization processes involving these catalysts that the present invention is concerned.

The catalysts of the invention are all ferric hydrates, i. e. compounds containing iron in the ferric state together with one or more hydroxyl radicals or with water. Ferric hydroxide $Fe(OH)_3$, sometimes termed hydrated ferric oxide, is active. So also are basic ferric acetate and ferric chloride hexahydrate, $FeCl_3 \cdot 6H_2O$. In the case of the latter two, the salts as ordinarily sold commercially are satisfactory. With ferric hydroxide, however, by far the best results are obtained when it is freshly prepared shortly before use. In making it, any water-soluble ferric salt is treated with ammonium hydroxide to precipitate the ferric hydroxide, which is then removed by filtration, washed with water and then with acetone, and dried without heating.

These ferric hydrates are not limited in their catalytic activity to the polymerization of propylene oxide to solid polymers. They also catalyze the polymerization to solid polymers of the other lower olefin oxides, i. e. those containing no more than four carbon atoms per molecule, such as ethylene oxide, chloropropylene oxide, and isobutylene oxide. They are also effective in catalyzing the copolymerization of propylene oxide or another lower olefin oxide with up to equal parts by weight of a second organic epoxide. For instance, ethylene oxide, chloropropylene oxide, isobutylene oxide, 1,2-epoxy butane, the two 2,3-epoxy butanes, and styrene oxide may all be copolymerized with propylene oxide using the catalysts of the invention. Polymerization may be carried out en masse or in a non-aqueous inert solvent or suspending medium.

In making solid polymers and copolymers using the catalysts of the invention, the monomer or mixture of monomers and the catalyst may simply be charged together into a closed vessel and heated until polymerization is complete. The mixture is advantageously agitated during polymerization. The proportion of catalyst used is small, being satisfactorily from 0.1 to 5 per cent by weight of the oxide or oxide mixture to be polymerized, preferably 0.5 to 2 per cent. In general, the maximum yields of high molecular weight solid polymer are obtained with the lowest operable proportion of catalyst within the range given. Polymerization temperature is in the range 40° to 150° C., with 70° to 100° C. being preferred, and 80° about the optimum. Below 70° C. the polymerization time becomes unduly long, whereas at much above 100° C. the yield of high molecular weight polymer is reduced. Within the 40° to 150° temperature range, the polymerization time may vary from 3 to 200 hours, the shorter times being at the higher temperatures. In the preferred range of 70° to 100° C., a time of 40 to 180 hours is usually sufficient to insure substantial completion of the reaction.

Instead of effecting mass polymerization as just described, the procedure may be carried out with the oxide monomer, catalyst, and product all dissolved in an inert solvent. In general, roughly equal proportions of monomer and solvent are used. Preferred solvents are diethyl ether, diisopropyl ether, petroleum ether, benzene, and n-hexane. It is advantageous to choose a solvent which boils at about polymerization temperature, and to heat the solution to induce gentle reflux, thereby insuring close control of temperature. The presence of a solvent reduces slightly the rate of polymerization but favors conversion of a somewhat higher proportion of the monomer to the desired solid polymer.

The crude product resulting from the polymerization or copolymerization process contains, in addition to the desired solid resin, whatever liquid polymers may have formed, residual oxide monomer, such solvent as was employed, and catalyst residue. This crude material is first warmed if necessary to vaporize off the unreacted monomer and the solvent. The resulting product, a tough rubbery mass of brown color, is treated in any convenient way to remove the iron-containing catalyst and to separate the desired solid resin from liquid polymer present. Preferably, the rubbery mass is dissolved in several volumes of solvent for the polymer, e. g. hot acetone, and the solution acidified, as with hydrochloric acid, to convert the iron-containing catalyst to soluble iron salts. The resulting clear yellow solution is then chilled to a temperature sufficiently low to cause the solid polymer present to crystallize out of solution, e. g. below −20° C. The crystalline material may then be further purified by recrystallization from acetone, yielding white solid polymer having a molecular weight sufficiently high that its softening point is over 50° C.

In an alternative purification step, the acetone solution of the crude polymeric product may be treated with a small proportion of water to convert the iron-containing complex catalyst to an iron hydroxide precipitate. The latter may be removed by filtration, after which the polymer is recovered by crystallization.

The following examples will further illustrate the invention but are not to be construed as limiting its scope.

*Example 1*

A ferric hydroxide (or hydrated ferric oxide) catalyst was prepared by treating an aqueous solution of ferric chloride with concentrated ammonium hydroxide in equivalent quantity. The resulting precipitate was separated by filtration, washed with acetone, and dried by warming under vacuum. It exhibited on analysis a 13.5 per cent loss in ignition, and contained less than 0.05 per cent chloride. The iron content (Fe) was 60.6 per cent.

A charge of liquid propylene oxide and 2.0 per cent by weight of this ferric hydroxide catalyst was heated with agitation at 81° C. for 160 hours. The entire mixture was converted to a brown rubbery solid polymer. This mass was dissolved in hot acetone and sufficient concentrated hydrochloric acid was added to convert the ferric hydrate present to soluble ferric chloride. The solution was then chilled to −20° C., whereupon a solid polymer crystallized out of solution and was separated by filtration. This polymer was recrystallized twice from acetone. The final product was a white solid having a specific gravity of about 1.03, a melting point above 50° C., and a molecular weight over 100,000. It was easily formed into a film by molding.

In the polymerization, the propylene oxide charged was 98 per cent converted to polymeric products, liquid and solid. The yield of high molecular weight solid polymer was 26.9 per cent.

*Example 2*

A ferric hydroxide catalyst was prepared by treating an aqueous solution of $Fe(NO_3)_3 \cdot 9H_2O$ with ammonium hydroxide. The resulting ferric hydroxide, after drying, was employed as a catalyst in 2 per cent concentration in the polymerization of propylene oxide at 80° C. for 187 hours. The conversion of propylene oxide was 76.7 per cent and the yield of solid polypropylene oxide was 23.3 per cent.

In a similar test, the ferric hydroxide was made from $Fe_2(SO_4)_3$. The conversion to polymer was 67.5 per cent, the yield of solid polymer being 21.4 per cent.

*Example 3*

A charge of liquid propylene oxide and 2.0 per cent by weight of ferric chloride hexahydrate ($FeCl_3 \cdot 6H_2O$) as catalyst was heated in a glass-lined stirring autoclave at 80° C. for 69 hours. The crude product was dissolved in five volumes of a mixture of equal parts by volume of acetone and straight-run gasoline, acidified with concentrated hydrochloric acid to render the iron salts soluble, and solid polymer was crystallized out of solution by cooling to −30° C. The overall yield of purified solid polymer, based on propylene oxide charged, was 18 per cent.

*Example 4*

A charge of 50 parts by weight of liquid propylene oxide was dissolved in an equal volume of diisopropyl ether as polymerization solvent. As catalyst, 1.0 part of ferric chloride hexahydrate $FeCl_3 \cdot 6H_2O$ was added. The solution was heated at 80° to 85° C. for 306 hours. The ether solvent was evaporated off and purified solid polypropylene oxide separated as in the previous examples. The yield of solid polymer was 25.0 per cent.

*Example 5*

Commercial basic ferric acetate was washed repeatedly with acetone and dried. A series of charges of liquid propylene oxide and 2.0 per cent by weight of the washed and dried ferric acetate catalyst were heated in a closed vessel to 100° C. and then cooled promptly to 80° C. They were then maintained at 80° C. for periods varying from 24 hours to 264 hours. The 24 hour run was polymerized to a viscous oil from which solid polypropylene oxide was recovered in 20.9 per cent yield. The 264 hour run produced a reddish-brown solid mass from which solid polypropylene oxide was recovered in 40.8 per cent yield. The other runs gave yields intermediate between these two.

*Example 6*

A charge of 50 parts by weight of propylene oxide, 50 parts of chloropropylene oxide, and 1.9 parts of ferric hydroxide catalyst as in Example 3 was heated in a closed glass vessel with agitation at 80° C. for 168 hours. The resulting solid copolymer was recovered by crystallization from acetone as in the preceding examples. It had a melting point above 50° C.

*Example 7*

A charge of chloropropylene oxide and 1.9 per cent by weight of ferric hydroxide was heated in a closed vessel at 80° C. for 168 hours. The product was a brown viscous liquid. By recrystallization from acetone, purified solid polychloropropylene oxide was separated.

What is claimed is:

1. A process of making solid homopolymeric propylene oxide which comprises mixing propylene oxide with from 0.1 to 5 per cent by weight of a ferric hydrate catalyst selected from the class consisting of ferric hydroxide, ferric chloride hexahydrate, and basic ferric acetate, heating the mixture at a temperature of 70° to 100° C. for a time sufficient substantially to complete polymerization, and separating solid polypropylene oxide from the resulting product.

2. A process of making solid homopolymeric propylene oxide which comprises mixing propylene oxide with ferric hydroxide, heating the mixture at about 80° C. for from 40 to 180 hours, and separating solid polypropylene oxide from the resulting product.

3. A process of making a solid copolymer of propylene oxide with up to an equal proportion by weight of another oxide of the class consisting of ethylene oxide, chloropropylene oxide, isobutylene oxide, 1,2-epoxybutane, the two 2,3-epoxybutanes and styrene oxide which comprises mixing the monomers with from 0.1 to 5 per cent by weight of a ferric hydrate catalyst of the class consisting of ferric hydroxide, ferric chloride hexahydrate, and basic ferric acetate, heating the resulting mixture at a temperature of 70° to 100° C. for a time sufficient substantially to complete polymerization, and separating solid copolymer from the resulting product.

4. A process of forming a solid polymer of an olefin oxide containing no more than four carbon atoms per molecule which comprises mixing a monomeric material composed of epoxides and containing at least 50 percent by weight of the olefin oxide with a small but operable proportion of a ferric hydrate catalyst selected from the class consisting of ferric hydroxide, ferric chloride hexahydrate, and basic ferric acetate, and heating the mixture at a temperature of 40° to 150° C. to effect polymerization.

5. A process according to claim 4 wherein the catalyst is present in a proportion of from 0.1 to 5 percent by weight of the monomeric material.

References Cited in the file of this patent

UNITED STATES PATENTS

| | | |
|---|---|---|
| 2,054,099 | Rothrock | Sept. 15, 1936 |
| 2,172,747 | Bowles et al. | Sept. 12, 1939 |
| 2,327,053 | Marple et al. | Aug. 17, 1943 |
| 2,484,370 | Ballard et al. | Oct. 11, 1949 |